United States Patent Office 3,085,853
Patented Apr. 16, 1963

3,085,853
METHOD OF EMPLOYING DEXTRANS
Chester A. Lesinski and Edward J. Sullivan, Bay City, Mich., assignors to The Dow Chemical Company, Midland, Mich., a corporation of Delaware
No Drawing. Filed Dec. 23, 1958, Ser. No. 782,370
2 Claims. (Cl. 23—52)

This invention is concerned with the utilization of high molecular weight polysaccharides produced by bacteria and is particularly directed to an improved method for facilitating the sedimentation and separation of finely divided solids from aqueous suspensions thereof.

Difficultly settleable suspensions of finely divided solids are encountered in numerous processes as, for example, in the waste water from coal washers, in the processing of various ores and in the clarification of water for industrial and municipal use. In the past, various inorganic agents such as lime, alum and ferric salts have been employed to flocculate finely divided solids and to improve the rate of sedimentation thereof. More recently, organic flocculation and sedimentation aids have found application, particularly in the mining industry. Such agents have consisted of primarily two classes, namely, modified starches, such as causticized corn starch, and synthetic high molecular water-soluble polyelectrolytes. However, such agents have left important problems unsolved. Thus, for example, in the treatment of water for municipal use, one essential is that no toxic materials be introduced into the treated water. Further, in any operation for facilitating sedimentation of finely divided solids, it is desirable to maintain the dosage of sedimentation aid at as low a level as possible to avoid contamination of the clarified product.

It is an object of the present invention to provide a novel method for facilitating the separation of finely divided solids from aqueous suspension. It is a further object to provide such a method which is applicable to a particularly difficultly-settleable suspension. Yet another object is to provide a method for facilitating the separation of finely divided solids from aqueous suspensions wherein the agent employed is substantially free of toxic hazards. Other objects will become apparent from the following specification and claims.

In accordance with the present invention, it has been discovered that the incorporation of native dextrans in aqueous suspensions of difficultly-settleable finely divided solids markedly increases the rate of sedimentation of said solids and thereby facilitates the separation of the solids from aqueous suspensions. It is among the advantages of the invention that the dextran materials are substantially nontoxic to higher animals.

Dextrans are high molecular weight polysaccharides produced in known manner by the fermentation of certain sugars by bacteria or by enzymes derived from bacteria. In general, dextrans are produced by bacterial action of an organism such as *Leuconostoc mesenteroides* or *Streptobacterium dextranicum* or the like on a nutrient medium in which sucrose is the principal carbon source. Procedures for the production, purification and characterization of native dextrans have been published by Jeanes et al., Journal of the American Chemical Society, 76, 5041–5052 (1954). Native dextrans will vary somewhat in properties depending upon the particular organism or strain of organism employed in the fermentation, the nutrient mixture supplied to the organism and the particular conditions under which the fermentation is carried out.

For use in the present invention, it is essential to use water-soluble dextrans and it is generally desirable to employ dextrans of relatively high molecular weight. Thus, water-soluble dextrans having a molecular weight of at least 50,000 have been found to give some improvement in the rate of sedimentation of finely divided suspended solids. However, water-soluble dextrans having molecular weights of at least 500,000 and ranging up to weights of 10,000,000 or more are preferred. Further, it appears to be desirable to employ dextrans having a preponderance of the glucose units joined together through 1:6 glucoside linkages. In the examples set forth below, the expression "NRRL Strain No." refers to strains of bacteria of which type cultures have been deposited with the Culture Collection, Northern Utilization Research Branch, Agricultural Research Service, U.S. Department of Agriculture.

In carrying out the invention, the dextran is incorporated with the suspension of finely divided solids in any suitable fashion in an amount sufficient to increase the rate of sedimentation of said solids. In general, the distribution of the dextran in the suspension is facilitated if the dextran is dispersed in water or dissolved prior to its incorporation in the suspension. In any case, it is preferred that thorough and rapid mixing of the dextran with the suspension be accomplished prior to the initiation of sedimentation.

The amount of dextran to be employed will vary depending upon the characteristic properties of the particular dextran, the size of the particles to be settled, the nature of the suspended solids and the like. Good results have been obtained when employing from about 0.1 lb. to 3 lbs. or more of dextran per ton of finely divided solids in the suspension.

It has been found that dextrans are effective for facilitating the sedimentation of finely divided solids at various temperatures and over a considerable range of pH. However, the dextrans appear to be most effective when employed in neutral or alkaline media and it is preferred to adjust the pH of the suspension to at least about 6 prior to the incorporation of the dextran.

The following examples illustrate the invention but are not to be construed as limiting the same.

Example 1

In the processing of bauxite ore as a source of aluminum, the bauxite is digested under strongly alkaline conditions in a solution containing sodium hydroxide and sodium carbonate. In such operations, aluminum oxide is dissolved while iron oxide, titanium dioxide and a sodium aluminum silicate complex remain undissolved and issue from the digestors as finely divided solids suspended in the leach liquor and known as "red mud." In the usual practice in the aluminum industry, from about 4 to 5 pounds of caustic-hydrolyzed starch is added per ton of bauxite to accelerate sedimentation of the red mud. The following determinations illustrate the use of the dextran agent in the above-described process.

600 grams of sodium hydroxide and 200 grams of sodium carbonate were dissolved in water and the solution diluted to a total of 4 liters. Said solution was heated to the boiling point, 500 grams of dry Jamaican bauxite ore added thereto and the resulting mixture heated at the boiling point for a period of 1 hour to dissolve aluminum oxide from the ore. The final volume was adjusted to 4.5 liters and the hot suspension was subjected to violent agitation by means of an Eppenbach homogenizer operating at 2700 revolutions per minute for a period of 1 minute. Following the homogenization step, the suspension of red mud was divided into portions of 250 milliliters each and each such portion maintained at a constant temperature of about 90° C. The red mud suspension was treated with dextran or causticized corn starch by pouring 250 milliliters of the red mud suspension into a vessel containing a predetermined amount of dextran or starch solution, stirring gently for 15 seconds and placing the treated slurry in a sedimentation tube maintained in a constant temperature bath regulated at 90° C. The dextran employed was a commercial product having a molecular weight of well over 1,000,000 and produced by the NRRL B-512 strain of *Leuconostoc mesenteroides*. The dextran was added to the red mud suspension as an aqueous 0.5 percent by weight solution and the caustic-hydrolyzed starch as a 2.5 percent by weight solution. The red mud suspension in the sedimentation tube was observed to ascertain the rate of settling of the suspended solids, the relative size of the flocs formed in the suspension and the clarity of the supernatant liquid. The results are summarized in the following table.

| Sedimentation Agent | Lbs. of Agent per Ton of Ore | Sedimentation rate, ft. per hr. | Floc Size |
|---|---|---|---|
| Dextran | 1.5 | 1.79 | Large. |
| Do | 2.0 | 4.35 | Very large. |
| Do | 3.0 | 7.15 | Do. |
| Do | 3.5 | 20.0 | Do. |
| Causticized corn starch | 4.0 | 1.18 | Medium. |
| Do | 10.0 | 2.09 | Do. |

In all the above determinations, the supernatant liquid was clear. When no sedimentation agent was added to the above red mud suspension, no significant, observable sedimentation of the suspended solids could be detected in 90 minutes.

*Example 2*

The procedure of Example 1 was followed except that 500 grams of Demerara bauxite ore from British Guiana was substituted for the Jamaican bauxite ore of the previous example. The sedimentation rate of an untreated portion of the red mud suspension was determined in similar fashion to serve as a check. The results are summarized in the following table.

| Sedimentation Agent | Lbs. of Agent per Ton of Ore | Sedimentation Rate, ft. per hr. | Floc Size | Clarity of Supernatant Liquid |
|---|---|---|---|---|
| None | | 2.0 | No flocs | Turbid. |
| Dextran | 0.125 | 10.5 | Medium | Slightly cloudy. |
| Do | 0.25 | 18.2 | do | Do. |
| Do | 0.5 | 35.2 | Large | Clear. |
| Do | 1.0 | 52.2 | do | Do. |
| Causticized corn starch | 1.25 | 10.9 | Small | Slightly cloudy. |
| Do | 2.5 | 16.4 | Medium | Do. |
| Do | 5.0 | 23.6 | do | Clear. |

*Example 3*

Determinations were carried out on the red mud suspension prepared as in Example 1 from Jamican bauxite ore and employing a variety of dextrans produced from various bacterial cultures. The bacterial cultures are identified as to strain by the NRRL No. as defined above. The molecular weights were calculated from the intrinsic viscosities on the basis of a curve established from determinations of molecular weight by light scattering on dextrans of various known intrinsic viscosities. The source of the dextrans, intrinsic viscosities thereof, calculated molecular weight and rate of sedimentation of red mud are summarized in the following table.

All the dextrans were employed in the amount of 3 pounds per ton of bauxite ore.

| NRRL Strain No. | Species of Bacteria | Intrinsic Viscosity | Molecular weight in millions | Rate of Sedimentation, ft. per hr. |
|---|---|---|---|---|
| B-512F | *Leuconostoc mesenteroides* | 0.953 | 1.29 | 16.25 |
| B-1416 | do | 0.875 | 1.09 | 11.44 |
| B-1255 | *Streptobacterium dextranicum* | 0.696 | 0.69 | 5.9 |
| B-1210 | *Leuconostoc mesenteroides* | 0.698 | 0.69 | 3.85 |
| B-1420 | *Leuconostoc dextranicum* | 0.522 | 0.39 | 3.13 |

*Example 4*

A slurry of coal fines from a coal washery contains 6.83 percent by weight of suspended solids and has a pH of 7.5. 250-milliliter portions of the slurry were placed in graduated cylinders to determine the sedimentation rate. To 3 such cylinders, an aqueous 0.05 percent by weight solution of dextran was added in amounts to provide 0.1, 0.2 and 0.3 pound, respectively, of dextran per ton of suspended solids. The dextran employed was a native dextran and a commercial product produced by strain NRRL No. B-512, having a molecular weight of over 10,000,000. The dextran solution was added to the coal slurry in 3 equal increments with 3 inversions of the cylinder after each incremental addition to accomplish thorough mixing of the dextran with the suspension. On completion of the addition and mixing, the cylinders were brought to an upright position to allow the suspended solids to settle. An untreated portion of the coal slurry was agitated in a similar fashion and allowed to settle to serve as a check. The extent to which the suspended solids had subsided and the nature of the flocs formed, if any, was recorded periodically and the settling rate of the solids was calculated. The results are set forth in the following table.

| Sedimentation Agent | Amount of Agent, lbs. per ton | Sedimentation rate, ft. per hr. | Floc Size |
|---|---|---|---|
| None | | 0.55 | No flocs. |
| Dextran | 0.1 | 3.15 | Very small. |
| Do | 0.2 | 5.70 | Small. |
| Do | 0.3 | 8.80 | Medium. |

In the clarification of industrial water supplies a common procedure is to add a coagulant such as aluminum sulfate, ferric chloride, chlorinated copperas, milk of lime or some combination thereof to form a coagulum which aids in carrying down colloidally dispersed suspended matter. Native dextrans have been found to be a markedly efficient sedimentation aid in accelerating the settling of the fine particles of coagulum in such processes provided the pH of the aqueous system is adjusted to a pH of at least 6. Similarly, good results have been obtained employing native dextrans as a flocculant and sedimentation aid in accelerating the settling of slurries of taconite tailings, in clarifying the effluent from the lime-soda water softening process and in settling calcium carbonate slurries such as are obtained in the Solvay soda process.

We claim:
1. In the method for extracting alumina from bauxite wherein the bauxite is digested at an elevated temperature with a strongly alkaline aqueous solution to produce a solution of alumina containing finely divided solid impurities in suspension therein and said impurities are thereafter separated from suspension by sedimentation, the improvement which comprises thoroughly mixing a native dextran with the suspension prior to the initiation of sedimentation, said dextran being employed in the amount of from about 0.1 to 3 pounds per ton of bauxite extracted.
2. A method according to claim 1 wherein the dextran has a molecular weight of at least 500,000.

References Cited in the file of this patent

UNITED STATES PATENTS

| | | |
|---|---|---|
| 2,625,529 | Hedrick et al. | Jan. 13, 1953 |
| 2,685,369 | Crossley | Aug. 3, 1954 |
| 2,728,725 | Gloor | Dec. 27, 1955 |
| 2,822,643 | Witt et al. | Feb. 11, 1958 |
| 2,831,841 | Jones | Apr. 22, 1958 |
| 2,853,414 | Wimmer | Sept. 23, 1958 |
| 2,885,357 | Archibald et al. | May 5, 1959 |
| 2,894,603 | Vasen | July 14, 1959 |

(Other references on following page)

| | | |
|---|---|---|
| 2,903,438 | Stautzenberger et al. | Sept. 8, 1959 |
| 2,937,143 | Goren | May 17, 1960 |

FOREIGN PATENTS

| | | |
|---|---|---|
| 475,671 | Great Britain | Nov. 24, 1937 |
| 764,547 | Great Britain | Dec. 28, 1956 |

OTHER REFERENCES

Kabot et al.: "Journal of Immunology," vol. 70, No. 6, June 1953, pages 514–532.

Cohen et al.: "Proceedings of the Society for Experimental Biology and Medicine," vol. 88, No. 4, April 1955, pages 517–519.

Marshall et al.: "Proceedings of the Society for Experimental Biology and Medicine," vol. 97, No. 3 (March 1958), pages 587–589.

Ross et al.: "Journal of Clinical Investigation," vol. 38, No. 1, January 1959, pages 155–160.

Soil Science (periodical), vol. 73, No. 6, June 1952, article by Ruehrwein et al., pages 485–491.

Rubber Chemistry and Technology (periodical), vol. 13, 1940, article by Schweitzer, pages 408–414.